S. YATES.
RECIPROCATING-CHURN.

No. 192,104. Patented June 19, 1877.

Witnesses:
H. A. Daniels
W. Burris

Inventor:
Samuel Yates
by G. B. Fowler,
Attorney.

UNITED STATES PATENT OFFICE.

SAMUEL YATES, OF SEDALIA, MISSOURI.

IMPROVEMENT IN RECIPROCATING CHURNS.

Specification forming part of Letters Patent No. 192,104, dated June 19, 1877; application filed May 24, 1877.

*To all whom it may concern:*

Be it known that I, SAMUEL YATES, of Sedalia, in the county of Pettis and State of Missouri, have invented certain new and useful Improvements in Churn-Dashers; and I do hereby declare that the following is a full, clear, and exact description thereof, which will enable others skilled in the art to which it appertains to make and use the same, reference being had to the accompanying drawings, and to letters of reference marked thereon, which form a part of this specification, in which drawings—

Figure 1:
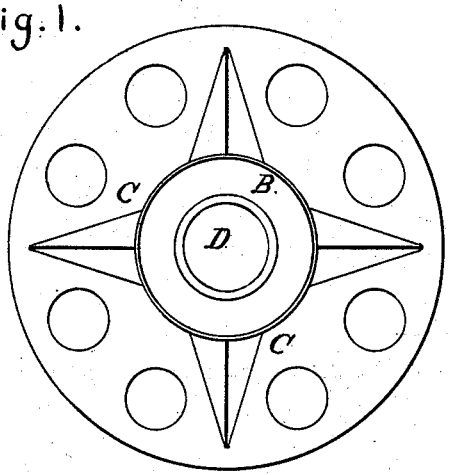
Figure 2:
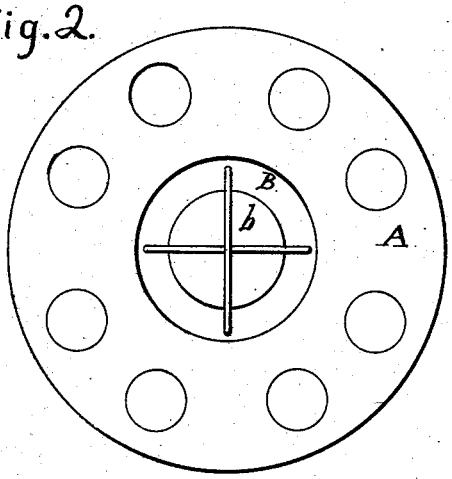
Figure 3:
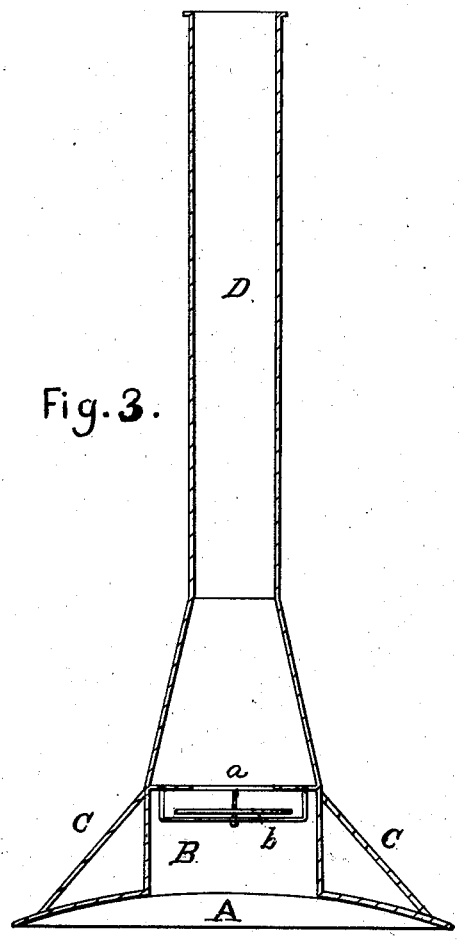

Figure 1 is a plan view of my improved churn-dasher; Fig. 2, a bottom view, and Fig. 3 a vertical section.

Like letters in all the figures of the drawing indicate like parts.

This invention is designed to be an improvement upon that patented by me October 13, 1868.

A is the concave disk secured to the air-chamber B by the angular braces C which also aid in cutting the cream. These braces are simply made of metal cut and bent to the required shape to fit against the walls of the chamber and over the top of the disk, a suitable number being placed at equidistances apart around the chamber, the walls of which extend up vertically and then taper in and upward to fit the tubular shaft D. At the upper end of the chamber where it tapers toward the shaft is a transverse plate provided with a valve-opening, $a$, which is opened and closed by a flat metallic valve, $b$, when the dasher is in operation. The valve rests in an open valve-seat consisting of two arms crossing each other at right angles, and then turned up and attached to the plate.

The dasher is operated in the usual manner, the downward motion of the dasher closing the valve and forcing the air from the chamber into the cream, and the upward motion of the same opening the valve, whence the chamber is again filled with air which is forced into the cream as before by the downward motion of the dasher, and so the operation goes on until the churning is accomplished, occupying about one minute and a half.

Having thus fully described my invention, what I claim therein as new, and desire to secure by Letters Patent, is—

The churn-dasher consisting of the concave disk A attached by angular braces to the tubular shaft D, having an enlarged air-chamber, B, provided with a flat metallic valve, $b$, to conduct the air through the chamber into the cream under the disk, substantially as described.

In testimony that I claim the foregoing as my own invention I affix my signature in presence of two witnesses.

SAMUEL YATES.

Witnesses:
ADAM C. SCOTT,
H. MITCHELL.